Aug. 9, 1949.   W. T. RILEY   2,478,836
WATER HEATER
Filed Oct. 19, 1946
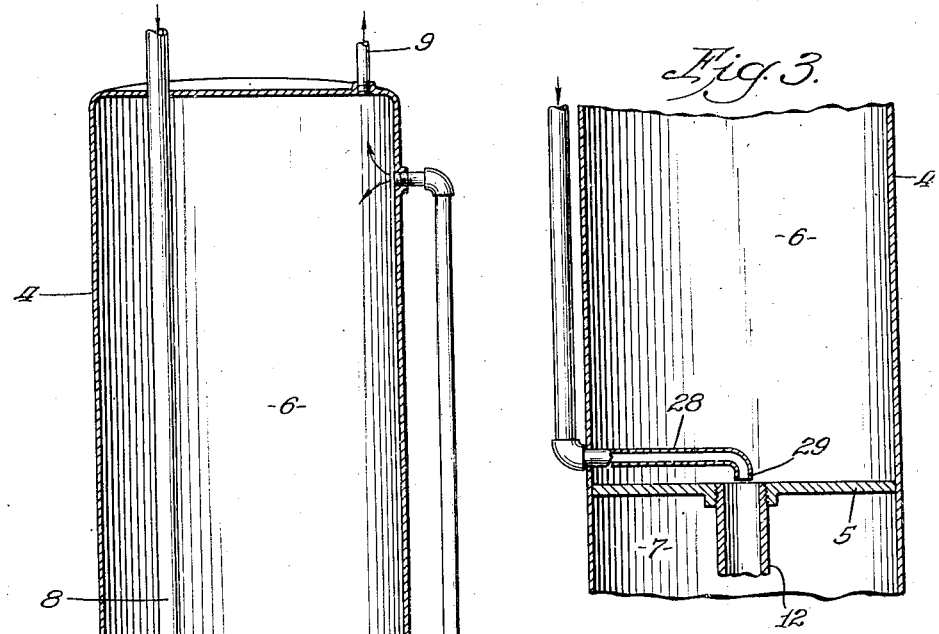
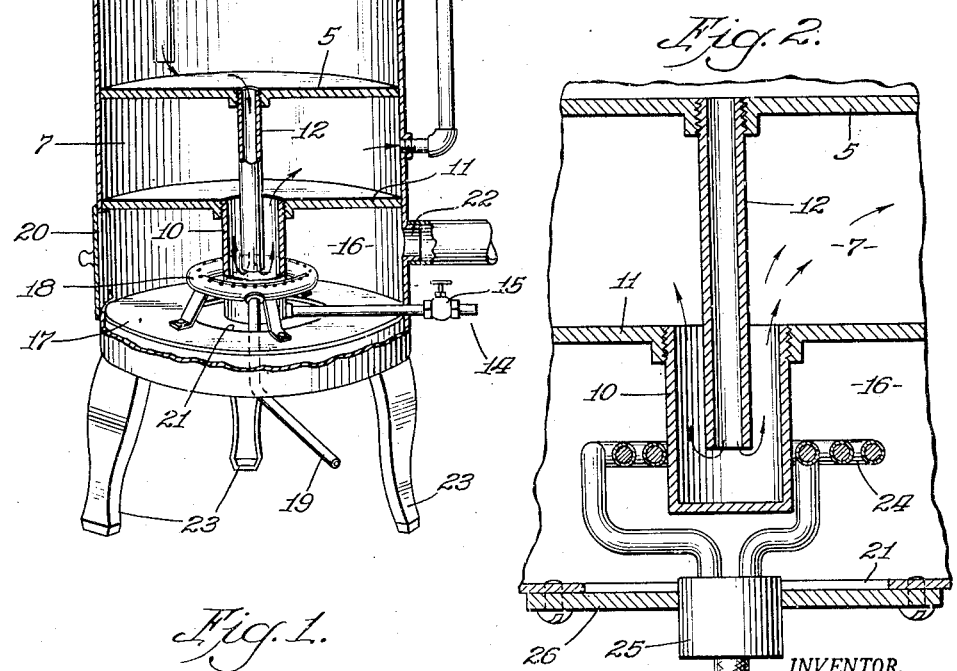
INVENTOR.
William T. Riley
BY
Albert I. Kegan
Atty.

Patented Aug. 9, 1949

2,478,836

UNITED STATES PATENT OFFICE 2,478,836

WATER HEATER

William T. Riley, Chicago, Ill.

Application October 19, 1946, Serial No. 704,393

2 Claims. (Cl. 219—39)

This invention relates in general to fluid heating apparatus and more particularly to domestic hot water heaters characterized by efficient water circulation.

An object of my invention is to provide a device having a heating tank in which only a small portion of the water is exposed to the heating elements at a given time, said heated water being available for immediate use.

Another object is to provide a hot water heater which may be conveniently altered to utilize either electricity, gas, or other fuels for heating the water.

Other objects and advantages of my improved domestic hot water heater which are disclosed as this description proceeds, or which are inherent to my invention, are illustrated in the accompanying drawings, in which:

Figure 1 is a perspective view of a preferred embodiment of my invention, taken partly in central vertical section;

Figure 2 is a detail sectional view of a modification of the invention using electricity for heating the fluid.

Figure 3 is a fragmentary view in central vertical section illustrating a further modification of my improved hot water heater.

Like reference characters refer to like parts in the drawings and the description which follows:

Referring more particularly to Figure 1, my invention comprises a cylindrical tank 4 divided by a horizontal partition 5 into a water storage compartment 6 and a water heating compartment 7. Water supply pipe 8 penetrates the storage compartment 6 and has its outlet proximate to partition 5, while water delivery pipe 9 extends vertically upward from said compartment. A cylindrical mixing chamber 10 extends downwardly from the tank bottom 11, and is connected with storage chamber 6 by a fluid circulating pipe 12. Exteriorly placed to by-pass the partition 5, fluid circulating pipe 13 communicates storage compartment 6 with heating compartment 7. A drain line 14, with a drain valve 15 therein, pierces the lower portion of the mixing chamber 10 so that the entire tank may be quickly and conveniently drained.

Immediately below the water heating compartment 7 is the heating chamber 16, which is further bounded by the downwardly extending walls of tank 4 and the supporting base plate 17. Within heating chamber 16, annular gas-heating element 18 surrounds the cylindrical mixing chamber 10, said heating element being supplied by a fuel supply pipe 19. An inspection door 20 and an air supply vent 21 open into the heating chamber 16, while flue connection 22 provides for the removal of waste gases. The three-legged base 23 shown is representative of conventional tank supports.

In some localities it is feasible to use electricity, instead of gas or other fuels, to heat the water. With this in view, I have designed my water heating device so that the electrical heating unit shown in Figure 2 may be substituted for the gas heating element shown in Figure 1. Resistance coil 24 encircles the mixing chamber 10 and terminates in the insulating plug 25, through which the heating element is energized. To further reduce heat losses, both the air supply vent 21 and the flue connections 22 may be covered by suitable plates (flue closure plate not shown). The particular form of heating elements shown should not be construed as a limitation of my invention as a variety of forms will be obvious to those skilled in the art.

A further modification of my invention, as shown in Figure 3, introduces the water supply pipe 28 at the lower portion of water storage compartment 6. By centering the outlet 29 of supply pipe 28 over the inlet to circulating pipe 12, turbulence within the storage compartment 6 is reduced to a minimum; thereby securing advantages which are discussed hereinafter.

With no demand upon the system, water neither enters nor leaves through piping 8 and 9. Upon application of heat by heating element 18 the temperature of the water within the mixing chamber 10 and heating compartment 7 is raised. The location of the heating element dictates that the temperatures in the upper portions of the mixing chamber 10 will be greater than the temperatures in the lower portions of said mixing chamber. It is evident, therefore, that thermal circulation will begin, with heated water flowing to storage compartment 6 through pipe 13 and cold water flowing to mixing chamber 10 through piping 12.

When water is drawn from storage compartment 6 through delivery pipe 9, an equal volume of cold water flows into said compartment through supply pipe 8; however, the thermal circulation previously described is in no way altered.

Partition 5 and all exterior surfaces may be insulated to reduce heat transfer. In the preferred form my invention is thoroughly insulated both to reduce external heat losses and to minimize internal heat transfer. By supplying water to storage compartment 6 at the lowest level possible, as best illustrated in Figure 3, and by insulating partition 5 thoroughly, convection currents in the lower portion of storage compartment 6 are reduced to a minimum. For the same reason, the outlet of circulating pipe 13 is placed proximate to the top of storage compartment 6.

The reduction in the turbulence hereinbefore described, normally caused by the entering supply water, combined with the reduction in convection currents by the novel arrangement explained above, results in less mixing action within storage compartment 6 than heretofore obtained. Hence, a more marked temperature gradient exists between the upper and lower levels of storage compartment 6 and hot water is more quickly obtained after the application of heat.

If the use of electricity as the heating medium is desired, my invention may be rapidly and inexpensively converted to its use. If desired, the resistance coil 24, electrical coupling element 25, and cover plate 26 may be conveniently assembled into a single unit. As is illustrated in Figure 2, the conversion consists of removing the gas-burning element 18 and accessories, and in their place substituting the electrical assembly previously described. The flue connection 22 would then be covered by a closure plate to reduce heat losses.

While I have shown and described certain embodiments of my invention, it is to be understood that these embodiments have been given by way of example only and that various changes and rearrangements of the details shown herein may be made without departing from the spirit of my invention, the scope of which is defined in the appended claims.

I claim:

1. A water heating and storing apparatus consisting of: a base; a heating portion supported on said base; a closed cylindrical tank above said heating portion; a horizontal partition dividing said tank into a relatively small heating compartment contiguous said heating portion and a relatively large storage compartment above said heating compartment; a tank bottom; a cylindrical mixing chamber piercing and extending downwardly from said tank bottom; a drain line coupled to the lower portion of said mixing chamber; a drain valve in said drain line; a fluid circulating pipe piercing said partition and extending downwardly into said mixing chamber; a second fluid circulating pipe exteriorly placed to by-pass said partition and connect the upper level of said storage compartment with said heating compartment; a vertical delivery pipe opening out of said storage compartment; a vertical supply pipe penetrating said storage compartment with outlet proximate said partition; and and an annular electrical heating coil within said heating portion surrounding said mixing chamber, and adapted to heat only that portion of said mixing chamber which lies above the bottom outlet of said drain line.

2. A water heating and storing apparatus comprising: a base; a heating portion supported on said base; a closed tank above said heating portion; a partition dividing said tank into a relatively small heating compartment adjacent said heating portion and a relatively large storage compartment above said heating compartment; a mixing chamber extending downwardly through the bottom of said tank; a fluid circulating conduit piercing said partition and extending downwardly into said mixing chamber; a second fluid circulating conduit communicating said storage compartment with said heating compartment; a supply conduit penetrating said storage compartment with the outlet of said supply conduit proximate said partition; a delivery conduit opening out of upper portion of said storage compartment; and a heating element within said heating portion substantially surrounding said mixing chamber, and adapted to heat only that portion of said mixing chamber which lies above the bottom outlet of said fluid circulating conduit.

WILLIAM T. RILEY.

REFERENCES CITED

The following references are of record in the file of this patent:

UNITED STATES PATENTS

| Number | Name | Date |
| --- | --- | --- |
| 1,681,377 | Stack | Aug. 21, 1928 |